(12) United States Patent
Benfold

(10) Patent No.: US 12,406,394 B2
(45) Date of Patent: Sep. 2, 2025

(54) MAGNETIC FIELD VECTOR MAP FOR ORIENTATION DETERMINATION

(71) Applicant: Niantic Spatial, Inc., San Francisco, CA (US)

(72) Inventor: Ben Benfold, Oxford (GB)

(73) Assignee: Niantic Spatial, Inc., San Francisco, CA (US)

( * ) Notice: Subject to any disclaimer, the term of this patent is extended or adjusted under 35 U.S.C. 154(b) by 88 days.

(21) Appl. No.: 18/209,351

(22) Filed: Jun. 13, 2023

(65) Prior Publication Data
US 2024/0420370 A1   Dec. 19, 2024

(51) Int. Cl.
G06T 7/73    (2017.01)
G06T 7/11    (2017.01)

(52) U.S. Cl.
CPC ............ *G06T 7/74* (2017.01); *G06T 7/11* (2017.01); *G06T 2207/30244* (2013.01)

(58) Field of Classification Search
CPC ... G06T 7/74; G06T 7/11; G06T 2207/30244; G01C 21/005; G01C 21/08
See application file for complete search history.

(56) References Cited

U.S. PATENT DOCUMENTS

| | | | | |
|---|---|---|---|---|
| 7,280,919 | B2* | 10/2007 | Yomoda | G01V 1/01 702/15 |
| 9,885,742 | B2* | 2/2018 | Corum | G01V 3/26 |
| 2005/0194973 | A1 | 9/2005 | Kwon et al. | |
| 2014/0222409 | A1* | 8/2014 | Efrat | G01R 33/10 703/13 |
| 2016/0084659 | A1 | 3/2016 | Yang et al. | |
| 2017/0115364 | A1* | 4/2017 | Efrat | G01R 33/072 |
| 2018/0203049 | A1* | 7/2018 | Corum | G01R 21/133 |
| 2019/0212152 | A1* | 7/2019 | Haverinen | G01S 5/02523 |
| 2020/0103232 | A1 | 4/2020 | Chan et al. | |

(Continued)

FOREIGN PATENT DOCUMENTS

| | | | | |
|---|---|---|---|---|
| CN | 109341682 | A | 2/2019 | |
| CN | 109633763 | B * | 7/2020 | ............. G01C 21/08 |

(Continued)

OTHER PUBLICATIONS

PCT International Search Report and Written Opinion, PCT Application No. PCT/IB2024/055771, Sep. 23, 2024, eight pages.

*Primary Examiner* — Mia M Thomas
(74) *Attorney, Agent, or Firm* — Fenwick & West LLP

(57) ABSTRACT

The present disclosure describes a method for estimating a pose of a client device using a magnetic field vector map. The method includes receiving a plurality of magnetic field measurements from a plurality of client devices, each magnetic field measurement describing a magnetic field vector at a geographic location. The method further includes grouping the magnetic field measurements into one or more region groups, aggregating the magnetic field measurements in each region group to generate a probability distribution of magnetic field vectors associated with the geographic region, determining a magnetic field vector within each geographic region, and generating a magnetic field vector map. Based on the magnetic field vector map, the method may include estimating a pose of a client device based on a user location of the client device and received magnetic field vector from the client device.

17 Claims, 4 Drawing Sheets

(56) References Cited

U.S. PATENT DOCUMENTS

| | | | |
|---|---|---|---|
| 2021/0088688 A1* | 3/2021 | Chapman | G05B 13/048 |
| 2021/0095966 A1* | 4/2021 | Li | G01P 15/08 |
| 2022/0254045 A1* | 8/2022 | Boardman | H04N 23/695 |
| 2023/0415033 A1* | 12/2023 | Miller | A63F 13/25 |
| 2024/0033631 A1* | 2/2024 | Benfold | A63F 13/216 |
| 2024/0071018 A1* | 2/2024 | Benfold | G06T 19/006 |
| 2024/0125871 A1* | 4/2024 | Chernyy | G01R 33/02 |
| 2024/0337489 A1* | 10/2024 | Benfold | G01C 25/005 |
| 2024/0337709 A1* | 10/2024 | Benfold | G01R 33/0035 |
| 2024/0342598 A1* | 10/2024 | Benfold | A63F 13/428 |

FOREIGN PATENT DOCUMENTS

| | | | | |
|---|---|---|---|---|
| KR | 10-2017-0090630 A | | 8/2017 | |
| WO | WO-2024256997 A1 * | 12/2024 | | G06T 7/11 |

\* cited by examiner

400

Receive a plurality of magnetic field measurements from a plurality of client devices
405

Group, based on the geographic location of each magnetic field measurement, the magnetic field measurements into one or more region groups
410

Aggregate the magnetic field measurements in each region group to generate a probability distribution of magnetic field vectors associated with the geographic region
415

Determine a magnetic field vector within each geographic region based on the probability distribution
420

Generate a magnetic field vector map that includes the determined magnetic field vector and the corresponding geographic region
425

Receive a first user data from a first client device, the first user data describing a first user location and a first magnetic field vector
430

Estimate a pose of the first client device based on the first user data and the generated magnetic field vector map
435

FIG. 4

MAGNETIC FIELD VECTOR MAP FOR ORIENTATION DETERMINATION

TECHNICAL FIELD

The subject matter described relates generally to device localization, and, in particular, to generating pose estimates for a client device using a magnetic field vector map.

BACKGROUND

An online system may track the location and orientation (collectively "pose") of a user device in the physical world to provide services to the user. For example, an online gaming system may provide an augmented reality experience to users by providing content to be displayed on a user's client device based on the pose of the user.

To determine a user's orientation, the user's client device may capture magnetic field measurements that measure a local magnetic field at the client device's location and may assume that the measured magnetic field points northwards. The client device can estimate the user's orientation based on the measured magnetic field. For example, if a user uses a compass to estimate orientation, and the measured magnetic field is pointing "backwards" (i.e., in the opposite direction that the user is facing), then the user's orientation is likely to be the opposite to the direction of the local magnetic field. Generally, the local magnetic field is Earth's magnetic field that is generated by the Earth. However, the local magnetic field measured by a client device is often not identical to the Earth's magnetic field at the client device's location, i.e., the local magnetic field is not pointing towards true North. For example, magnetic field measurements are often affected by the local structures, such as power lines, which produce magnetic fields continuously as electric current flows through them, and buildings with a large number of metallic structures, which can also change the strength or direction of the local magnetic field.

Some systems estimate the pose of a client device based on visual inertial odometry (VIO) data. While VIO data is effective for determining relative changes in a device's pose, other data may be needed (e.g., magnetometer data or global navigation satellite system (GNSS) data) to determine a device's original pose. Thus, an interruption to a VIO session will cause an interruption to the effective pose determination for the device. For example, a user may switch off the client device briefly or cover the camera, which interrupts the client device's determination of its orientation using VIO. When this happens, the device may need to take time to collect VIO data so that the device can correctly determine its orientation. However, in the meantime, the device may be unable to predict its orientation, which leads to an interruption in applications services that depend on the device's orientation.

SUMMARY

The present disclosure describes approaches to pose estimates of a client device using a magnetic field vector map. By accumulating magnetic field measurements from a plurality of client devices, a magnetic field vector map can be generated. The magnetic field vector map includes a plurality of geographic regions, and each geographic region corresponds to a magnetic field vector representing the local magnetic field in the geographic region. Based on the magnetic field vector map, the local magnetic field at a particular location can be estimated when the particular location is identified on the magnetic field vector map. The determined magnetic field vector may be compared to the received magnetic field vector from the client device, and a pose of the client device may be estimated based on the comparison result. Additionally, the magnetic field vector map may be used as an alternative/supplemental pose estimate method for visual inertial odometry (VIO). For example, the magnetic field vector map may allow fast recovery of orientation following an interruption to a VIO session. By matching the magnetic field vector directions before and after the interruption, the pose estimate based on the VIO may be quickly recovered.

In one or more embodiments, a computer-implemented method is disclosed. The method includes receiving a plurality of magnetic field measurements from a plurality of client devices, each magnetic field measurement describing a magnetic field vector at a geographic location. Generating the magnetic field vector map may include grouping the magnetic field measurements into one or more region groups, aggregating the magnetic field measurements in each region group to generate a probability distribution of magnetic field vectors associated with a geographic region, and determining a magnetic field vector within each geographic region based on the corresponding probability distribution. Based on the magnetic field vector map, the method may include estimating a pose of a client device based on a user location of the client device and received magnetic field vector from the client device. In other embodiments, a system configured to perform the method and a non-transitory computer-readable storage medium storing instructions for performing the method are disclosed.

BRIEF DESCRIPTION OF THE DRAWINGS

FIG. 4 is a flowchart describing one iteration of a method of estimating a pose of a client device using a magnetic field vector map, in accordance with one or more embodiments.

The figures and the following description describe certain embodiments by way of illustration only. One skilled in the art will readily recognize from the following description that alternative embodiments of the structures and methods may be employed without departing from the principles described. Reference will now be made to several embodiments, examples of which are illustrated in the accompanying figures.

DETAILED DESCRIPTION

Various embodiments are described in the context of a parallel reality game that includes augmented reality content in a virtual world geography that parallels at least a portion of the real-world geography such that player movement and actions in the real-world affect actions in the virtual world and vice versa. Those of ordinary skill in the art, using the disclosures provided herein, will understand that the subject matter described is applicable in other situations where magnetic field measurements are desirable. For example, the method described herein may be implemented in a location-based application that displays virtual navigation instructions or text labels that relate to real-world information. In addition, the inherent flexibility of computer-based systems allows for a great variety of possible configurations, combinations, and divisions of tasks and functionality between and among the components of the system. For instance, the systems and methods according to aspects of the present disclosure can be implemented using a single computing device or across multiple computing devices (e.g., connected in a computer network).

Figure 1:
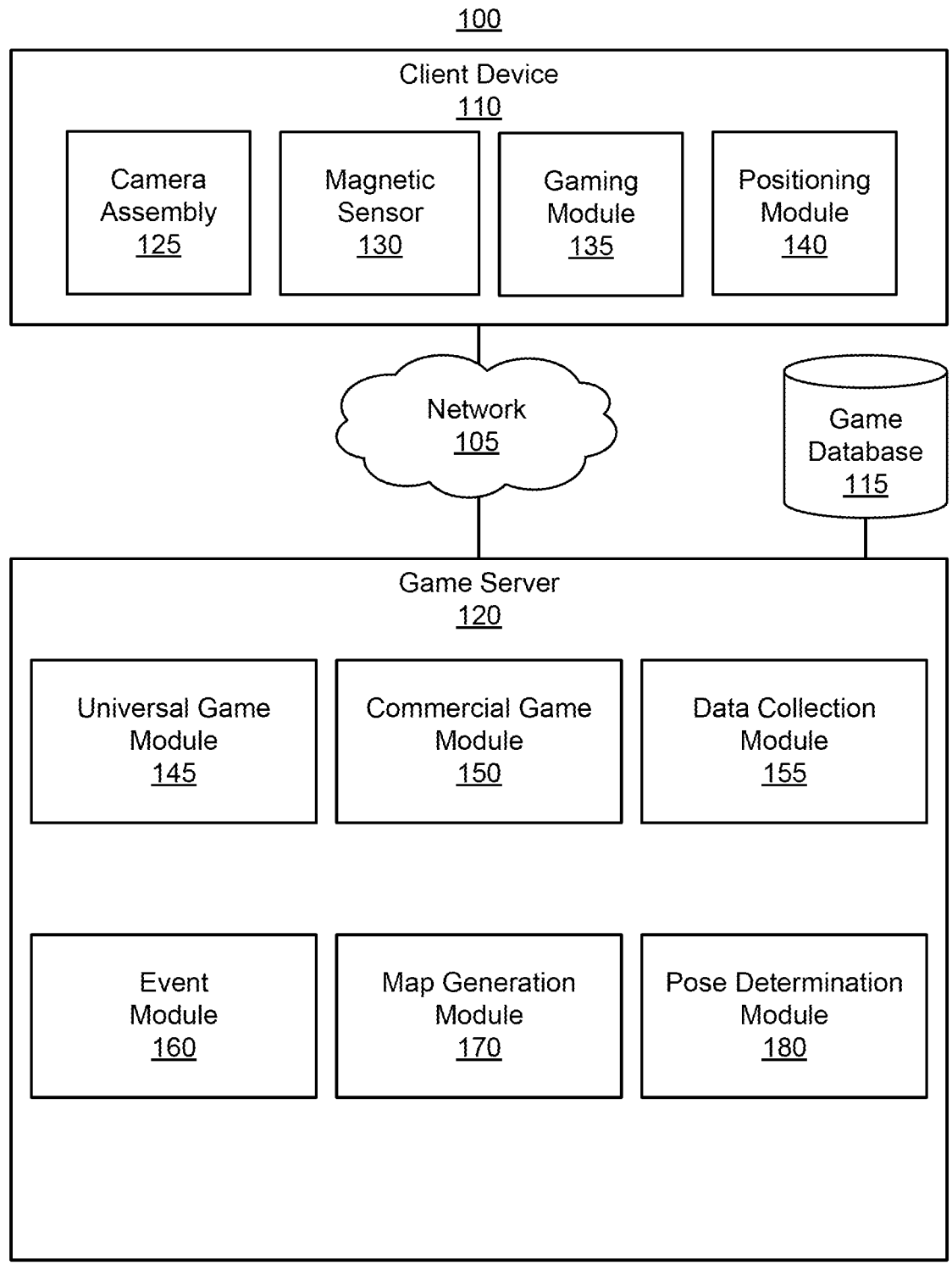
FIG. 1 illustrates a networked computing environment, in accordance with one or more embodiments.

FIG. 1 illustrates a networked computing environment 100, in accordance with one or more embodiments. Although FIG. 1 depicts a parallel reality gaming environment as an example, the figure is intended as a functional description of the various features which may be present in networked computing environments than as a structural schematic of the implementations described herein. In practice, and as recognized by those of ordinary skill in the art, a networked computing environment may have additional, less, or variations of the components provided in FIG. 1. Specifically, the magnetic field vector map described herein is applicable in any networked computing environment.

The networked computing environment 100 provides for the interaction of players in a virtual world having a geography that parallels the real world. In particular, a geographic area in the real world can be linked or mapped directly to a corresponding area in the virtual world. A player can move about in the virtual world by moving to various geographic locations in the real world. For instance, a player's position in the real world can be tracked and used to update the player's position in the virtual world. Typically, the player's position in the real world is determined by finding the location of a client device 110 through which the player is interacting with the virtual world and assuming the player is at the same (or approximately the same) location. For example, in various embodiments, the player may interact with a virtual element if the player's location in the real world is within a threshold distance (e.g., ten meters, twenty meters, etc.) of the real-world location that corresponds to the virtual location of the virtual element in the virtual world. For convenience, various embodiments are described with reference to "the player's location" but one of skill in the art will appreciate that such references may refer to the location of the player's client device 110.

The networked computing environment 100 uses a client-server architecture, where a game server 120 communicates with a client device 110 over a network 105 to provide a parallel reality game to players at the client device 110. The networked computing environment 100 also may include other external systems such as sponsor/advertiser systems or business systems. Although only one client device 110 is illustrated in FIG. 1, any number of client devices 110 or other external systems may be connected to the game server 120 over the network 105. Furthermore, the networked computing environment 100 may contain different or additional elements and functionality may be distributed between the client device 110 and the server 120 in a different manner than described below.

A client device 110 can be any portable computing device that can be used by a player to interface with the game server 120. For instance, a client device 110 can be a wireless device, a personal digital assistant (PDA), portable gaming device, cellular phone, smart phone, tablet, navigation system, handheld GPS system, wearable computing device, a display having one or more processors, or other such device. In another instance, the client device 110 includes a conventional computer system, such as a desktop or a laptop computer. Still yet, the client device 110 may be a vehicle with a computing device. In short, a client device 110 can be any computer device or system that can enable a player to interact with the game server 120. As a computing device, the client device 110 can include one or more processors and one or more computer-readable storage media. The computer-readable storage media can store instructions which cause the processor to perform operations. The client device 110 is preferably a portable computing device that can be easily carried or otherwise transported with a player, such as a smartphone or tablet.

The client device 110 communicates with the game server 120 providing the game server 120 with sensory data of a physical environment. The client device 110 includes a camera assembly 125 that captures image data in two dimensions of a scene in the physical environment where the client device 110 is. In the embodiment shown in FIG. 1, each client device 110 includes a magnetic sensor 130 and software components such as a gaming module 135 and a positioning module 140. The client device 110 may include various other input/output devices for receiving information from and/or providing information to a player. Example input/output devices include a display screen, a touch screen, a touch pad, data entry keys, speakers, and a microphone suitable for voice recognition. The client device 110 may also include other various sensors for recording data from the client device 110 including but not limited to movement sensors, accelerometers, gyroscopes, other inertial measurement units (IUs), barometers, positioning systems, thermometers, light sensors, depth sensors, etc. The client device 110 can further include a network interface for providing communications over the network 105. A network interface can include any suitable components for interfacing with one more networks, including for example, transmitters, receivers, ports, controllers, antennas, or other suitable components.

The camera assembly 125 captures image data of a scene of the environment in which the client device 110 is located. The camera assembly 125 may utilize a variety of varying photo sensors with varying color capture ranges at varying capture rates. The camera assembly 125 may contain a wide-angle lens or a telephoto lens. The camera assembly 125 may be configured to capture single images or video as the image data. Additionally, the orientation of the camera assembly 125 could be parallel to the ground with the camera assembly 125 aimed at the horizon. The camera assembly 125 captures image data and shares the image data with the computing device on the client device 110. The image data can be appended with metadata describing other details of the image data including sensory data (e.g., temperature, brightness of environment) or capture data (e.g., exposure, warmth, shutter speed, focal length, capture time, etc.). The camera assembly 125 can include one or more cameras which can capture image data. In one instance, the camera assembly 125 comprises one camera and is configured to capture monocular image data. In another instance, the camera assembly 125 comprises two cameras and is configured to capture stereoscopic image data. In various other implementations, the camera assembly 125 comprises a plurality of cameras each configured to capture image data.

The magnetic sensor 130 measures the magnetic field around the client device 110. The magnetic sensor 130 may include a compass, a magnetometer, a magnetic field detector, etc. A magnetic field is a vector field that describes the magnetic influence on magnetic materials, moving electric charges, etc. A magnetic field vector describes the direction and strength of the magnetic field at a point in space. In some embodiments, the magnetic sensor 130 may take a magnetic field measurement at a location where the client device 110 is locating. The magnetic field measurement obtains a magnetic field vector at the location that is associated with a geographic location. The position module 140 may use the magnetic field measurement to determine the location of the client device 110. The client device 110 may send the magnetic field measurement to the game server 120 for generating a magnetic field vector map and/or estimating a pose of the client device 110.

In some embodiments, the magnetic sensor 130 may include three separate sensors internally aligned separately on x, y and z axes of the client device 110. The x, y, and z axes define a body frame, i.e., device coordinates, of the client device 110. Each of these three sensors measures the intensity of the magnetic field along the respective directions at the location of the client device 110. The addition of the three measured magnetic field intensities is a vector addition, producing a magnetic field vector at the location of the client device 110 (i.e., local magnetic field vector). Take a smartphone as an exemplary client device 110. The z-axis may be perpendicular to the plane of the smartphone, the x-axis is along the short length of the smartphone to the right, and the y-axis along the long length of the smartphone to the front. When a smartphone is facing up and its plane is parallel to the ground surface, the z-axis of the smartphone points up. Assuming the magnetic sensor 130 measures a large intensity along the y-axis and a small (or zero) intensity along the x-axis, a vector addition of the intensities calculates the local magnetic field vector that is aligned with the y-axis of the smartphone. If the local magnetic field vector is the same as the Earth's magnetic field and points to the geographic north, then the y-axis of the smartphone is pointing to the geographic north (i.e., the magnetic south) and the x-axis of the smartphone may be pointing to the geographic east. Therefore, based on the device coordinates of the smartphone, the front of smartphone is pointing to the geographic north. When rotating the smartphone in the horizontal plane, the measured local magnetic field vector will rotate accordingly in the device coordinates, e.g., a compass needle rotates within the compass as the smartphone rotates. As the device coordinates (i.e., x, y and z axes of the client device 110) are known, the client device 110 may convert the measured local magnetic field vector from the device coordinates to the Earth frame (i.e., world coordinates) and thereby determine the orientation of the client device 110 in the physical space. In this way, by measuring the local magnetic field vector, the client device 110 can estimate its orientation in the real world.

The gaming module 135 provides a player with an interface to participate in the parallel reality game. The game server 120 transmits game data over the network 105 to the client device 110 for use by the gaming module 135 at the client device 110 to provide local versions of the game to players at locations remote from the game server 120. The game server 120 can include a network interface for providing communications over the network 105. A network interface can include any suitable components for interfacing with one more networks, including for example, transmitters, receivers, ports, controllers, antennas, or other suitable components.

The gaming module 135 executed by the client device 110 provides an interface between a player and the parallel reality game. The gaming module 135 can present a user interface on a display device associated with the client device 110 that displays a virtual world (e.g., renders imagery of the virtual world) associated with the game and allows a user to interact in the virtual world to perform various game objectives. In some embodiments, the gaming module 135 presents image data from the real world (e.g., captured by the camera assembly 125) augmented with virtual elements from the parallel reality game. In these embodiments, the gaming module 135 may generate virtual content and/or adjust virtual content according to other information received from other components of the client device 110. For example, the gaming module 135 may adjust a virtual object to be displayed on the user interface according to a depth map of the scene captured in the image data. In other embodiments, the gaming module 135 generates virtual objects for display on a semi-transparent display through which the user views the real world (e.g., an AR headset, AR glasses, etc.). Thus, the virtual objects may be overlaid on the user's view of the real world.

The gaming module 135 can also control various other outputs to allow a player to interact with the game without requiring the player to view a display screen. For instance, the gaming module 135 can control various audio, vibratory, or other notifications that allow the player to play the game without looking at the display screen. The gaming module 135 can access game data received from the game server 120 to provide an accurate representation of the game to the user. The gaming module 135 can receive and process player input and provide updates to the game server 120 over the network 105. The gaming module 135 may also generate and/or adjust game content to be displayed by the client device 110. For example, the gaming module 135 may generate a virtual element based on depth information. In another example, the gaming module 135 may update a virtual element based on a pose of the camera assembly.

In one embodiment, determination of a coarse position of the client device 110 may be performed at the client device 110. The client device 110 includes a positioning module 140 comprising any device or circuitry for monitoring the position of the client device 110. For example, the positioning module 140 can determine actual or relative position by using a satellite navigation positioning system (e.g. a GPS system, a Galileo positioning system, the Global Navigation satellite system (GLONASS), the BeiDou Satellite Navigation and Positioning system), an inertial navigation system, a dead reckoning system, based on IP address, by using triangulation and/or proximity to cellular towers or Wi-Fi hotspots, and/or other suitable techniques for determining position. The positioning module 140 may also use the measured magnetic field data from the magnetic sensor 130 to determine the location of the client device 110 in the physical space. The positioning module 140 may further include various other sensors that may aid in accurately positioning the client device 110 location. While the positioning module 140 may be used to determine a course position of the client device 110, re-localization of the client device 110 (e.g., to determine the device's fine-grain location and orientation) is performed by the pose determination module 180 on the game server 120, as discussed below. For example, the coarse location (e.g., the GPS coordinates) identified by the positioning module 140 may be used to identify a three-dimensional (3D) model of the environment in which the client device 110 is located, and the pose determination module 180 localizes against the retrieved model using images captured by the camera assembly 125 and the magnetic field measured by the magnetic sensor 130 on the client device 110.

In embodiments in which a coarse position of the client device is determined client-side, the positioning module 140 tracks the position of the player as the player moves around with the client device 110 in the real world and provides the player position information to the gaming module 135. The gaming module 135 updates the player position in the virtual world associated with the game based on the actual position of the player in the real world. Thus, a player can interact with the virtual world simply by carrying or transporting the client device 110 in the real world. In particular, the location of the player in the virtual world can correspond to the location of the player in the real world. The gaming module 135 can provide player position information to the game server 120 over the network 105. In response, the game server 120 may enact various techniques to verify the client device 110 location to prevent cheaters from spoofing the client device 110 location. It should be understood that location information associated with a player is utilized only if permission is granted after the player has been notified that location information of the player is to be accessed and how the location information is to be utilized in the context of the game (e.g., to update player position in the virtual world). In addition, any location information associated with players will be stored and maintained in a manner to protect player privacy.

The game server 120 can be any computing device and can include one or more processors and one or more computer-readable storage media. The computer-readable storage media can store instructions which cause the processor to perform operations. The game server 120 can include or can be in communication with a game database 115. The game database 115 stores game data used in the parallel reality game to be served or provided to the client(s) 110 over the network 105.

The game data stored in the game database 115 can include: (1) data associated with the virtual world in the parallel reality game (e.g. imagery data used to render the virtual world on a display device, geographic coordinates of locations in the virtual world, etc.); (2) data associated with players of the parallel reality game (e.g. player profiles including but not limited to player information, player experience level, player currency, current player positions in the virtual world/real world, player energy level, player preferences, team information, faction information, etc.); (3) data associated with game objectives (e.g. data associated with current game objectives, status of game objectives, past game objectives, future game objectives, desired game objectives, etc.); (4) data associated with virtual elements in the virtual world (e.g. positions of virtual elements, types of virtual elements, game objectives associated with virtual elements; corresponding actual world position information for virtual elements; behavior of virtual elements, relevance of virtual elements etc.); (5) data associated with real-world objects, landmarks, positions linked to virtual-world elements (e.g. location of real-world objects/landmarks, description of real-world objects/landmarks, relevance of virtual elements linked to real-world objects, etc.); (6) game status (e.g. current number of players, current status of game objectives, player leaderboard, etc.); (7) data associated with player actions/input (e.g. current player positions, past player positions, player moves, player input, player queries, player communications, etc.); and (8) any other data used, related to, or obtained during implementation of the parallel reality game. The game data stored in the game database 115 can be populated either offline or in real time by system administrators and/or by data received from users/players of the environment 100, such as from a client device 110 over the network 105.

The game server 120 can be configured to receive requests for game data from a client device 110 (for instance via remote procedure calls (RPCs)) and to respond to those requests via the network 105. For instance, the game server 120 can encode game data in one or more data files and provide the data files to the client device 110. In addition, the game server 120 can be configured to receive game data (e.g., player positions, player actions, player input, etc.) from a client device 110 via the network 105. For instance, the client device 110 can be configured to periodically send player input and other updates to the game server 120, which the game server 120 uses to update game data in the game database 115 to reflect any and all changed conditions for the game.

In the embodiment shown, the game server 120 includes a universal gaming module 145, a commercial game module 150, a data collection module 155, an event module 160, a map generation module 170, and a pose determination module 180. As mentioned above, the game server 120 interacts with a game database 115 that may be part of the game server 120 or accessed remotely (e.g., the game database 115 may be a distributed database accessed via the network 105). In other embodiments, the game server 120 contains different and/or additional elements. In addition, the functions may be distributed among the elements in a different manner than described. For instance, the game database 115 can be integrated into the game server 120. Additionally, while the pose determination module 180 as described is located on the game server 120, in other embodiments, pose determination is performed at the client device 110, as discussed above.

The universal game module 145 hosts the parallel reality game for all players and acts as the authoritative source for the current status of the parallel reality game for all players. As the host, the universal game module 145 generates game content for presentation to players, e.g., via their respective client devices 110. The universal game module 145 may access the game database 115 to retrieve and/or store game data when hosting the parallel reality game. The universal game module 145 also receives game data from client device 110 (e.g., depth information, player input, player position, player actions, landmark information, etc.) and incorporates the game data received into the overall parallel reality game for all players of the parallel reality game. The universal game module 145 can also manage the delivery of game data to the client device 110 over the network 105. The universal game module 145 may also govern security aspects of client device 110 including but not limited to securing connections between the client device 110 and the game server 120, establishing connections between various client device 110, and verifying the location of the various client device 110.

The commercial game module 150, in embodiments where one is included, can be separate from or a part of the universal game module 145. The commercial game module 150 can manage the inclusion of various game features within the parallel reality game that are linked with a commercial activity in the real world. For instance, the commercial game module 150 can receive requests from external systems such as sponsors/advertisers, businesses, or other entities over the network 105 (via a network interface) to include game features linked with commercial activity in the parallel reality game. The commercial game module 150 can then arrange for the inclusion of these game features in the parallel reality game.

The game server 120 can further include a data collection module 155. The data collection module 155, in embodiments where one is included, can be separate from or a part of the universal game module 145. The data collection module 155 can manage the inclusion of various game features within the parallel reality game that are linked with a data collection activity in the real world. For instance, the data collection module 155 can modify game data stored in the game database 115 to include game features linked with data collection activity in the parallel reality game. The data collection module 155 can also analyze and data collected by players pursuant to the data collection activity and provide the data for access by various platforms.

The event module 160 manages player access to events in the parallel reality game. Although the term "event" is used for convenience, it should be appreciated that this term need not refer to a specific event at a specific location or time. Rather, it may refer to any provision of access-controlled game content where one or more access criteria are used to determine whether players may access that content. Such content may be part of a larger parallel reality game that includes game content with less or no access control or may be a stand-alone, access controlled parallel reality game.

The map generation module 170 receives a plurality of magnetic field measurements from a plurality of client devices 110. Each magnetic field measurement describes a magnetic field vector at a geographic location where the corresponding client device 110 is located when the magnetic field measurement is taken. The magnetic field sensor of the client device 110 may measure the magnetic field vectors in the client device's reference frame. To convert these vectors to the Earth's reference frame, the map generation module 170 may determine an orientation of the client device 110 in the Earth's reference frame and convert the magnetic field vector from the device reference frame to the world reference frame based on the client device's orientation. The device's orientation may be determined based on the GNSS (e.g., GPS) data, the VIO tracking data, or the Visual Positioning System (VPS) data. For example, a client device 110 may capture the magnetic field measurements while a VIO tracking session is active. Based on the VIO data, the client device 110 determines the device's orientation at the times that the magnetic field measurements are captured. The client device uses the VIO-determined orientation to convert the magnetic field vectors from the device reference frame to the world reference frame.

The map generation module 170 groups the magnetic field measurements into one or more region groups based on the geographic location of each magnetic field measurement. Each region group is associated with a geographic region and each region group contains magnetic field measurements measured at geographic locations within the geographic region of the region group. The grouped magnetic field measurements in each geographic region may include a plurality of magnetic field vectors of various directions and strengths. The map generation module 170 may further aggregate the magnetic field measurements in each region group to generate a probability distribution of magnetic field vectors associated with the geographic region.

Figure 2:
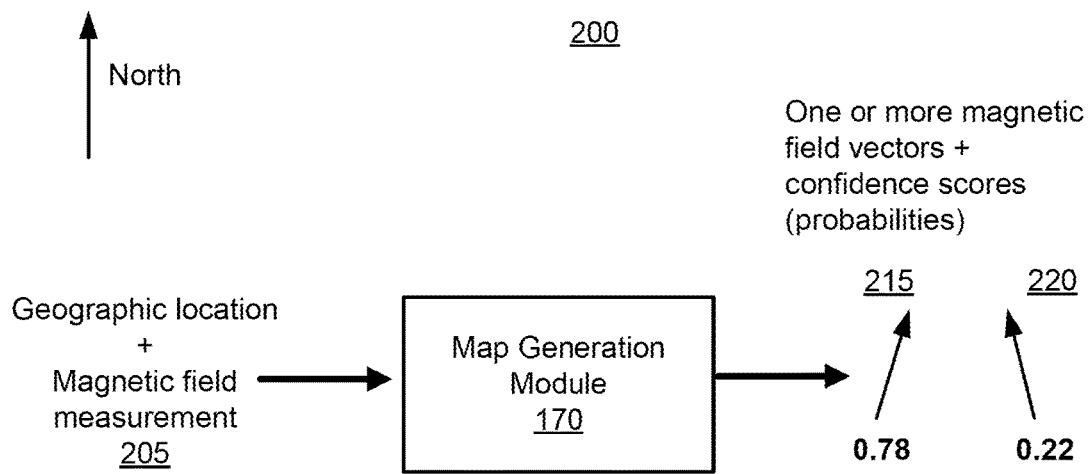
FIG. 2 illustrates use of a map generation algorithm to generate magnetic field vector map, in accordance with one or more embodiments.

In some embodiments, the map generation module 170 may input the magnetic field measurements into a map generation algorithm. For example, FIG. 2 illustrates a process 200 of using of a map generation module 170 to generate a magnetic field vector map. As shown in FIG. 2, the input 205 to the map generation module 170 includes a plurality of magnetic field measurements received from a plurality of client devices 110. Each magnetic field measurement includes a measured magnetic field vector and the corresponding geographic location. The output of the map generation module 170 includes a histogram of magnetic field vectors associated with a corresponding geographic region. The histogram of magnetic field vectors may be an exemplary illustration of a probability distribution of the magnetic field vectors. The histogram may include one or more magnetic field vectors, each having an associated confidence score. For instance, in the example shown in FIG. 2, the output includes a first magnetic field vector 215 having an associated confidence score of 0.78 and a second magnetic field vector 220 having an associated confidence score of 0.22. The map generation algorithm calculates the confidence score for each magnetic field vector. In some embodiments, each confidence score represents the probability that the magnetic field vector in the corresponding geographic region is correct. In one implementation, a confidence score may indicate a ratio of a particular magnetic field vector among all measured magnetic field vectors in a particular geographic region. For example, in a particular geographic region, 99% of the received magnetic field measurements show the magnetic field vector points to 5 degrees east of north. Accordingly, the confidence score of this magnetic field vector that points to 5 degrees east of north may be determined as 0.99. Thus, the local magnetic field vector may point to 5 degrees east of north rather than the north. In an alternative implementation, the confidence score may indicate the likelihood of a magnetic field vector to be measured in a particular geographic region. For example, in a particular geographic region, a magnetic field vector pointing to 5 degrees east of north has a confidence score of 0.99. When a client device 110 passes through this geographic region, the client device 110 can estimate that the measured local magnetic field vector is most likely to be pointing to 5 degrees east of north (i.e., with a 99% of probability). In some embodiments, the map generation module 170 continuously receives magnetic field measurements from the client devices 110 and aggregates additional magnetic field measurements in the geographic region. The additional magnetic field measurements are input in the map generation module 170 to update the histogram of the magnetic field vectors and the associated confidence scores.

Figure 3:
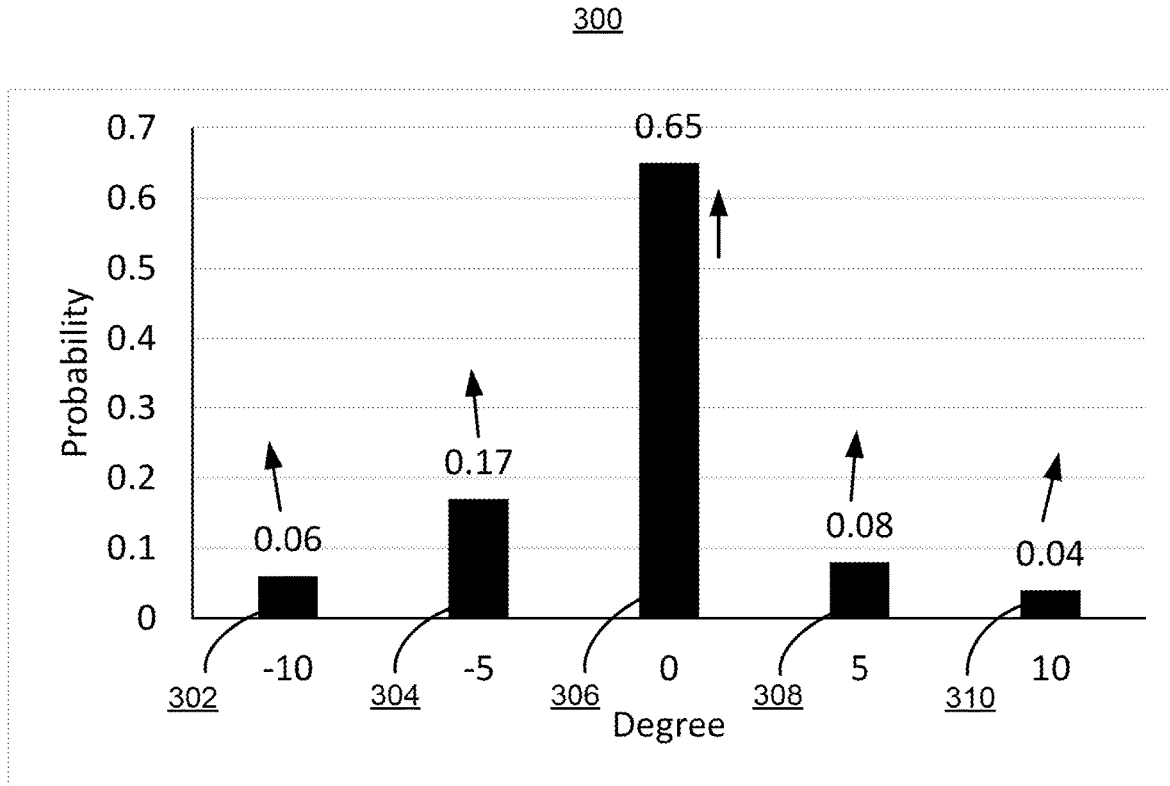
FIG. 3 illustrates an example histogram of magnetic field vectors, in accordance with one or more embodiments.

FIG. 3 illustrates an example histogram 300 of magnetic field vectors, in accordance with one or more embodiments. The histogram 300 is associated with a geographic region. As shown in FIG. 3, the histogram 300 may be presented as a bar graph, where each bar represents a particular magnetic field vector having an associated probability or a distribution of probabilities that the client device 110 is positioned in the geographic region associated with the histogram 300. The histogram is not limited to a two-dimensional representation but can also encompass a three-dimensional (3D) perspective. A 3D histogram represents the distribution and characteristics of the magnetic field vectors in three-dimensional space. One of skill in the art will appreciate that other data representations, such as Gaussian models, may be used in other embodiments.

The histogram 300 represents the probabilities that a measured magnetic field vector is oriented in different directions when a client device 110 is located in the geographic region. In FIG. 3, the histogram 300 includes five magnetic field vectors, 302, 304, 306, 608, and 310. Each magnetic field vector may represent an orientation of the magnetic field in the geographic region. Assuming the magnetic field vector 306 is in the same direction as the geographic north, i.e., having 0 degree with respect to the north, the magnetic field vector 302 is 10 degrees to the west, the magnetic field vector 304 is 5 degrees to the west, the magnetic field vector 308 is 5 degrees to the east, and the magnetic field vector 310 is 10 degrees to the east. The confidence score of each magnetic field vector is indicated by the probability associated with the magnetic field vector, and may be represented by the height of corresponding bar in the histogram 300. For example, the magnetic field vector 306 has the highest confidence score, 0.65; and the magnetic field vector 310 has the lowest confidence, 0.04.

In some embodiments, the histogram 300 is an example probability distribution that may be used. The histogram represents the likelihood of a magnetic field vector to be measured in a particular geographic region. In one example, the map generation module 170 may build the histogram 300 based on a plurality of magnetic field measurements from a plurality of client devices 110 without comparing the magnetic field measurements to the true local magnetic field vector. The confidence score of each magnetic field vector indicates the probability that a client device 110 measures the corresponding magnetic field vector in the particular geographic region. The magnetic field vector 306 has the highest confidence score, 0.65, indicating the highest probability of a measured magnetic field vector in this particular geographic region. A client device 110 that passes through this particular geographic region will, with a 65% of probability, measure a magnetic field vector that has the same direction with the magnetic field vector 306.

While the histogram 300 shown in FIG. 3 contains 5 bars, one of skill in the art will appreciate that the histogram of varying sizes may be used in other embodiments. For example, the magnetic fields are smooth and continuous, a mathematical model or machine learning algorithm are used to supplement the unmeasured magnetic field data. Moreover, one of skill in the art will recognize alternate means of visualizing probabilities associated with the underlying magnetic field vectors.

Returning now to FIG. 1, the map generation module 170 determines a magnetic field vector within each geographic region based on the corresponding histogram. In some embodiments, the determined magnetic field vector for a geographic region is used to represent the local magnetic field in the geographic region. In this way, the map generation module 170 may generate a magnetic field vector map that includes a plurality of geographic regions, and each geographic region corresponds to a magnetic field vector representing the local magnetic field in the geographic region. Based on the magnetic field vector map, the local magnetic field at a particular location can be computed/identified when the particular location is identified on the magnetic field vector map. In some embodiments, the magnetic field vector map may present the local magnetic field in three dimensions (3D). Each point in the magnetic field vector map is associated with a vector that indicates at least the 3D orientation of the magnetic field vector at that location. In some embodiments, the map generation module 170 may determine the magnetic field vector of the geographic region based on the confidence score for each of the magnetic field vectors in the histogram. For example, the map generation module 170 may select the magnetic field vector that has the highest confidence score, such as magnetic field vector 306 in FIG. 3. In some implementations, the map generation module 170 may select a magnetic field vector having a confidence score that meets or exceeds a score threshold. For example, the map generation module 170 may set a score threshold as 0.05. In this case, the magnetic field vector 310 in FIG. 3 which has a confidence score of 0.04 will not be considered. In some embodiments, as the map generation module 170 continuously receives magnetic field measurements from the client devices 110, the histogram of the magnetic field vectors and the associated confidence scores are also continuously updated. Consequently, the map generation module 170 may also continuously update the computed magnetic field vector and the corresponding magnetic field vector map.

The map generation module 170 may also use a magnetic field model for generating the magnetic field vector map. For example, the map generation module 170 may use data from a variety of sources to construct the magnetic field model and may update and refine the model with additional data. In one embodiment, the map generation module 170 may use existing map data to simulate a magnetic field vector map. The existing map data may include geographic locations and the corresponding geographic features. For example, the map generation module 170 may start with the Earth's magnetic field vector map which includes the Earth's magnetic field at any geographic location on the Earth. The map generation module 170 may then modify the Earth's magnetic field vector map based on the geographic features, constructions, etc. in a geographic region. For example, one geographic region may include a power plant that affects the local magnetic field. The map generation module 170 may simulate the power plant's magnetic effect on the local magnetic field, such as, changes in orientation, strength, scope of effect, etc. Based on the simulated effect, the map generation module 170 may update the magnetic field vector map.

In some embodiments, the map generation module 170 may use a model to predict a magnetic field vector that is most likely to represent the local magnetic field in a geographic region. The generated magnetic field vector map includes a plurality of geographic regions, and each geographic region corresponds to one or more magnetic field vectors. Each magnetic field vector corresponds to a confidence score indicating a probability that a client device 110 measures the corresponding magnetic field vector in the particular geographic region. The model may include a machine learning model, such as a deep neural network, a regression model, a classifier, or any other suitable type of machine learning model. The histogram of magnetic field vectors, the magnetic field measurements, and existing map data may be used to train the machine learning model. The map generation module 170 may input the magnetic field measurements to predict a magnetic field vector for a geographic region. Alternatively, the map generation module 170 may input the probabilities of the magnetic field vectors calculated based on the histogram to predict the magnetic field vector. In some embodiments, the model may output a confidence score with the predicted magnetic field vector. The confidence score of a magnetic field vector indicates the probability that a client device 110 measures the corresponding magnetic field vector in the particular geographic region. A higher confidence score may represent a higher likelihood. For example, assuming the map generation module 170 determines, in a particular geographic region, a first magnetic field vector having a confidence score of 0.91 and a second magnetic field vector having a confidence score of 0.09, then when a client device 110 passes through this geographic region, the probability that the client device 110 measures the first magnetic field vector is 91% and the probability that the client device 110 measures the second magnetic field vector is 9%. In one implementation, the magnetic field vector with the highest confidence score may be determined as the local magnetic field vector in the particular geographic region. In another implementation, the map generation module 170 may determine a predicted magnetic field vector having a confidence score that meets or exceeds a score threshold as the magnetic field vector of the geographic region.

In some embodiments, the map generation module 170 may use both the existing magnetic field vector map and the model to determine a magnetic field vector in a geographic region. The machine learning model may be used to adjust the existing magnetic field vector map. For example, the machine learning model is trained with geographic data including features such as power plant, signal tower, railroad, etc. The trained machine learning model may then be applied to geographic regions with similar features to predict a magnetic field vector in these regions. The predicted magnetic field vector may be used to update the magnetic field vector map.

The pose determination module 180 estimates a pose of a client device 110 based on the magnetic field vector map. The pose of a client device 110 may include a location and an orientation of the client device 110. In some embodiments, the client device 110 may send user data to the game server 120. The user data may include a user location of the client device 110 and a magnetic field vector measured at the user location. The pose determination module 180 may map the user location to the magnetic field vector map to identify the corresponding geographic region. Based on the geographic region, the pose determination module 180 may determine a local magnetic field vector based on the magnetic vector map. The determined magnetic field vector may then be compared to the received magnetic field vector from the client device 110, and the pose determination module 180 may estimate a pose of the client device 110 based on the comparison result.

For example, based on the magnetic field vector map, the determined local magnetic field vector indicates the local magnetic field vector is pointing to the geographic east at the user location. In the meantime, the magnetic field vector measured by the client device 110 is pointing to a backward direction in the body frame of the client device 110. With rotation matrices, the measured magnetic field vector can be converted from the body frame of the client device 110 to the Earth frame system and thereby the orientation of the client device 110 in the physical space can be determined. In this case, the determined magnetic field vector is in the Earth frame, and the measured magnetic field vector is in the body frame of the client device 110 and can be converted to the Earth frame. By comparing the determined magnetic field vector and the converted measured magnetic field vector, the pose determination module 180 may determine the pose of the client device 110. Here, the pose determination module 180 may estimate that the client device 110 is pointing to the opposite direction of the geographic east, and the user may be facing and/or moving to the west.

The network 105 can be any type of communications network, such as a local area network (e.g., intranet), wide area network (e.g., Internet), or some combination thereof. The network can also include a direct connection between a client device 110 and the game server 120. In general, communication between the game server 120 and a client device 110 can be carried via a network interface using any type of wired and/or wireless connection, using a variety of communication protocols (e.g., TCP/IP, HTTP, SMTP, FTP), encodings or formats (e.g., HTML, XML, JSON), and/or protection schemes (e.g., VPN, secure HTTP, SSL).

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

In addition, in situations in which the systems and methods discussed herein access and analyze personal information about users, or make use of personal information, such as location information, the users may be provided with an opportunity to control whether programs or features collect the information and control whether and/or how to receive content from the system or other application. No such information or data is collected or used until the user has been provided meaningful notice of what information is to be collected and how the information is used. The information is not collected or used unless the user provides consent, which can be revoked or modified by the user at any time. Thus, the user can have control over how information is collected about the user and used by the application or system. In addition, certain information or data can be treated in one or more ways before it is stored or used, so that personally identifiable information is removed. For example, a user's identity may be treated so that no personally identifiable information can be determined for the user.

According to aspects of the present disclosure, a player can interact with the parallel reality game by simply carrying a client device 110 around in the real world. For instance, a player can play the game by simply accessing an application associated with the parallel reality game on a smartphone and moving about in the real world with the smartphone. In this regard, it is not necessary for the player to continuously view a visual representation of the virtual world on a display screen in order to play the location-based game. As a result, a user interface can include a plurality of non-visual elements that allow a user to interact with the game. For instance, the game interface can provide audible notifications to the player when the player is approaching a virtual element or object in the game or when an important event happens in the parallel reality game. A player can control these audible notifications with an audio control. Different types of audible notifications can be provided to the user depending on the type of virtual element or event. The audible notification can increase or decrease in frequency or volume depending on a player's proximity to a virtual element or object. Other non-visual notifications and signals can be provided to the user, such as a vibratory notification or other suitable notifications or signals.

Those of ordinary skill in the art, using the disclosures provided herein, will appreciate that numerous game interface configurations and underlying functionalities will be apparent in light of this disclosure. The present disclosure is not intended to be limited to any one particular configuration.

FIG. 4 is a flowchart describing one iteration of a method 400 of estimating a pose of a client device using a magnetic field vector map, in accordance with one or more embodiments. The steps of FIG. 4 are illustrated from the perspective of the game server 120 performing the method 400. However, some or all of the steps may be performed by other entities and/or components. In addition, some embodiments may perform the steps in parallel, perform the steps in different orders, or perform different steps.

In the embodiment shown, a game server 120 communicates with a client device 110 over a network 105 to provide a location-based application, such as parallel reality game, to a user of the client device 110. The method 400 begins with the game server 120 receiving 405 a plurality of magnetic field measurements from a plurality of client devices 110. Each magnetic field measurement describes a magnetic field vector at a geographic location where the corresponding client device 110 is located when the magnetic field measurement is taken.

The game server 120 groups 410, based on the geographic location of each magnetic field measurement, the magnetic field measurements into one or more region groups. Each region group is associated with a geographic region. The grouped magnetic field measurements in each geographic region may include a plurality of magnetic field vectors of various directions and strengths.

The game server 120 aggregates 415 the magnetic field measurements in each region group to generate a histogram of magnetic field vectors associated with the geographic region. In some embodiments, the game server 120 may input the magnetic field measurements into a map generation algorithm. The input to the map generation algorithm may include a plurality of magnetic field measurements received from a plurality of client devices 110. The output of the algorithm may include a histogram of magnetic field vectors associated with a corresponding geographic region, each magnetic field vector having an associated confidence score. The map generation algorithm is used to calculate the confidence score for each magnetic field vector, and the confidence score represents the probability that the magnetic field vector in the corresponding geographic region is correct.

In some embodiments, the histogram of magnetic field vectors is a probability distribution of the magnetic field vectors in the associated geographic region. Each magnetic field vector corresponds to a confidence score indicating a probability that a client device 110 measures the corresponding magnetic field vector in the corresponding geographic region.

The game server 120 determines 420 a magnetic field vector within each geographic region based on the corresponding histogram. The determined magnetic field vector is used to represent the local magnetic field in the geographic region. Alternatively, the game server 120 may determines 420 a local magnetic field vector based on the probability distribution of the magnetic field vectors in the corresponding geographic regions. For example, the game server 120 may determine a magnetic field vector with the highest probability to represent the local magnetic field vector in the corresponding geographic region. In this way, the game server 120 may generate a magnetic field vector map that includes a plurality of geographic regions, and each geographic region corresponds to a magnetic field vector representing the local magnetic field in the geographic region. In some embodiments, the game server 120 may determine the magnetic field vector of the geographic region based on the confidence score for each of the magnetic field vectors in the histogram. In some embodiments, the game server 120 may also generate a magnetic field model for the magnetic field vector map and update the determined magnetic field vector using the magnetic field model.

The game server 120 generates 425 a magnetic field vector map that includes the determined magnetic field vector and the corresponding geographic region.

Based on the magnetic field vector map, the game server 120 may estimate a pose of a client device, for example, the orientation of the client device. The game server 120 receives 430 user data from a client device 110. The user data may include a user location of the client device 110 and a magnetic field vector measured at the user location.

The game server 120 estimates 435 a pose of the client device 110 based on the user location and the generated magnetic field vector map. The pose determination module 180 may map the user location to the magnetic field vector map to identify the corresponding geographic region. Based on the geographic region, the game server 120 may determine a local magnetic field vector using the magnetic vector map. The determined magnetic field vector may then be compared to the received magnetic field vector from the client device 110, and the game server 120 may estimate a pose of the client device 110 based on the comparison result.

Example Computing System

Figure 5:
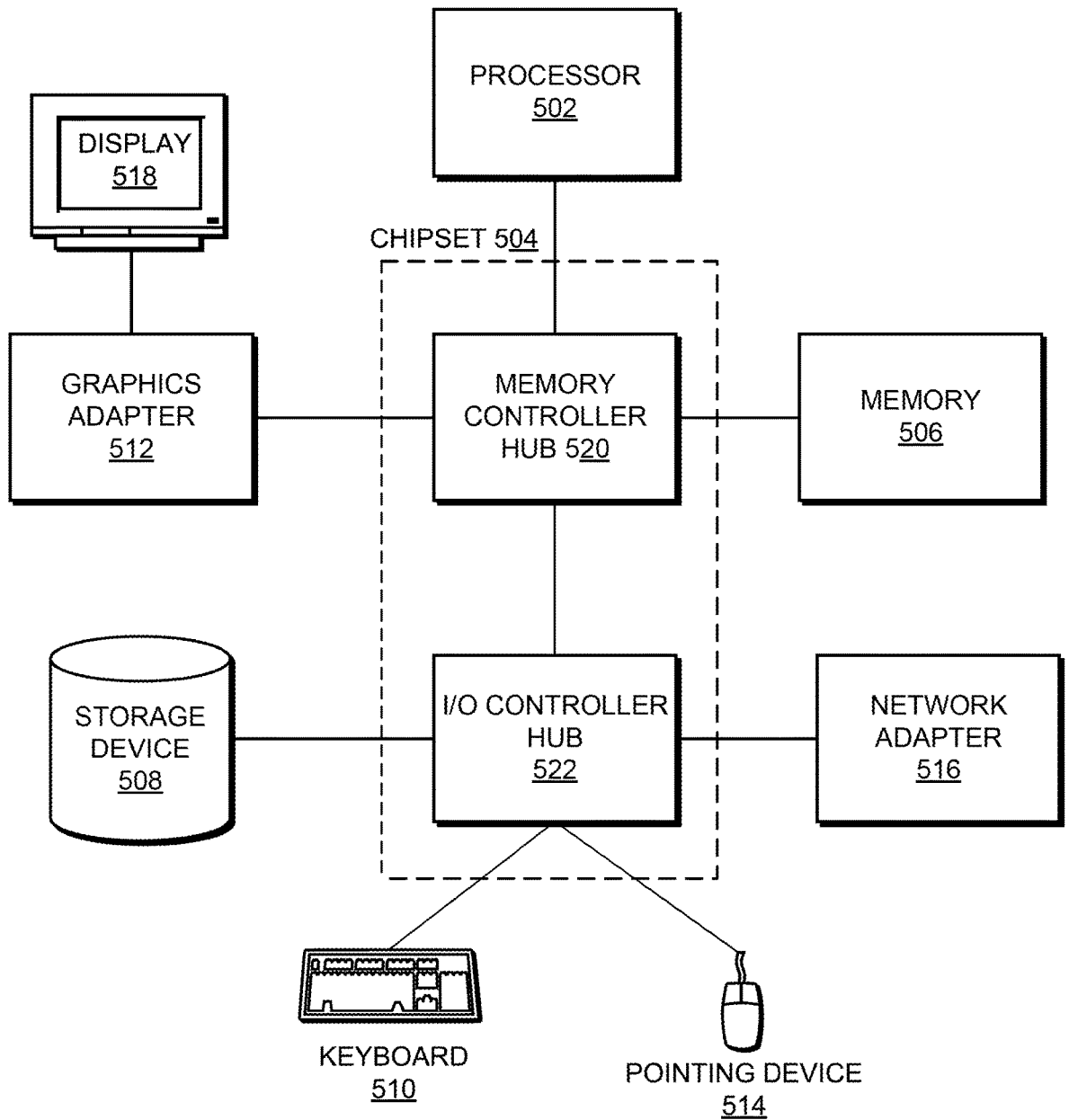
FIG. 5 is an example architecture of a computing device, in accordance with one or more embodiments.

FIG. 5 is an example architecture of a computing device, in accordance with one or more embodiments. Although FIG. 5 depicts a high-level block diagram illustrating physical components of a computer used as part or all of one or more entities described herein, in accordance with an embodiment, a computer may have additional, less, or variations of the components provided in FIG. 5. Although FIG. 5 depicts a computer 500, the figure is intended as functional description of the various features which may be present in computer systems than as a structural schematic of the implementations described herein. In practice, and as recognized by those of ordinary skill in the art, items shown separately could be combined and some items could be separated.

Illustrated in FIG. 5 are at least one processor 502 coupled to a chipset 504. Also coupled to the chipset 504 are a memory 506, a storage device 508, a keyboard 510, a graphics adapter 512, a pointing device 514, and a network adapter 516. A display 518 is coupled to the graphics adapter 512. In one embodiment, the functionality of the chipset 504 is provided by a memory controller hub 520 and an I/O hub 522. In another embodiment, the memory 506 is coupled directly to the processor 502 instead of the chipset 504. In some embodiments, the computer 500 includes one or more communication buses for interconnecting these components. The one or more communication buses optionally include circuitry (sometimes called a chipset) that interconnects and controls communications between system components.

The storage device 508 is any non-transitory computer-readable storage medium, such as a hard drive, compact disk read-only memory (CD-ROM), DVD, or a solid-state memory device or other optical storage, magnetic cassettes, magnetic tape, magnetic disk storage or other magnetic storage devices, magnetic disk storage devices, optical disk storage devices, flash memory devices, or other non-volatile solid state storage devices. Such a storage device 508 can also be referred to as persistent memory. The pointing device 514 may be a mouse, track ball, or other type of pointing device, and is used in combination with the keyboard 510 to input data into the computer 500. The graphics adapter 512 displays images and other information on the display 518. The network adapter 516 couples the computer 500 to a local or wide area network.

The memory 506 holds instructions and data used by the processor 502. The memory 506 can be non-persistent memory, examples of which include high-speed random-access memory, such as DRAM, SRAM, DDR RAM, ROM, EEPROM, flash memory.

As is known in the art, a computer 500 can have different and/or other components than those shown in FIG. 5. In addition, the computer 500 can lack certain illustrated components. In one embodiment, a computer 500 acting as a server may lack a keyboard 510, pointing device 514, graphics adapter 512, and/or display 518. Moreover, the storage device 508 can be local and/or remote from the computer 500 (such as embodied within a storage area network (SAN)).

As is known in the art, the computer 500 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 508, loaded into the memory 506, and executed by the processor 502.

Additional Considerations

Some portions of above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments. This is done merely for convenience and to give a general sense of the disclosure. This description should be read to include one or at least one and the singular also includes the plural unless it is obvious that it is meant otherwise. Where values are described as "approximate" or "substantially" (or their derivatives), such values should be construed as accurate +/-10% unless another meaning is apparent from the context. From example, "approximately ten" should be understood to mean "in a range from nine to eleven."

Upon reading this disclosure, those of skill in the art will appreciate still additional alternative structural and functional designs for a system and a process for determining a pose of client device. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed. The scope of protection should be limited only by the following claims.

What is claimed is:

1. A computer-implemented method, comprising:
   receiving a plurality of magnetic field measurements from a plurality of client devices, each magnetic field measurement describing a magnetic field vector measured by a client device at a geographic location;
   grouping, based on the geographic location of each magnetic field measurement, the magnetic field measurements into one or more region groups, wherein each region group is associated with a geographic region and wherein each region group comprises magnetic field measurements measured at geographic locations within the geographic region of the region group;
   aggregating the magnetic field measurements in each region group to generate a probability distribution of magnetic field vectors associated with the geographic region;
   determining a magnetic field vector within each geographic region based on the probability distribution, wherein the determined magnetic field vector is a vector that predicts a local magnetic field in the geographic region, wherein determining the magnetic field vector comprises:
      determining a confidence score for each of the magnetic field vectors in the geographic region, the confidence score indicating a probability of a corresponding magnetic field vector being measured in the geographic region; and
      determining the local magnetic field vector of the geographic region based on the confidence score for each of the magnetic field vectors;
   generating a magnetic field vector map that associates the determined magnetic field vector with the corresponding geographic region;
   receiving a user data from a client device, the user data describing a user location of the client device and a magnetic field vector at the user location; and
   estimating a pose of the client device based on the user data and the generated magnetic field vector map.

2. The method of claim 1, wherein determining the magnetic field vector of the geographic region based on the confidence score for each of the magnetic field vectors comprises:
   selecting, from the magnetic field vectors in the geographic region, a magnetic field vector having a confidence score that meets or exceeds a score threshold.

3. The method of claim 1, further comprising:
   aggregating additional magnetic field measurements in the geographic region to update the probability distribution of the magnetic field vectors;
   updating the confidence score for each of the magnetic field vectors; and determining the magnetic field vector of the geographic region with the updated confidence score.

4. The method of claim 1, wherein the determined magnetic field vector is a vector that predicts a true magnetic field in the geographic region.

5. The method of claim 1, wherein generating the magnetic field vector map comprises:
simulating the magnetic field vector map based on geographic locations and geographic features; and
updating the magnetic vector map using the probability distribution of the magnetic field vectors.

6. The method of claim 1, wherein determining the magnetic field vector within each geographic region based on the probability distribution comprises:
inputting the probability distribution of the magnetic field vectors in a machine learning model;
predicting a magnetic field vector that is most likely to represent the local magnetic field in the geographic region; and
determining the predicted magnetic field vector as the determined magnetic field vector in the geographic region.

7. The method of claim 1, wherein the magnetic field measurements are captured from magnetic sensors of a plurality of mobile devices.

8. A non-transitory computer-readable storage medium comprising instructions executable by a processor, the instructions executable to perform operations comprising:
receiving a plurality of magnetic field measurements from a plurality of client devices, each magnetic field measurement describing a magnetic field vector measured by a client device at a geographic location;
grouping, based on the geographic location of each magnetic field measurement, the magnetic field measurements into one or more region groups, wherein each region group is associated with a geographic region and wherein each region group comprises magnetic field measurements measured at geographic locations within the geographic region of the region group;
aggregating the magnetic field measurements in each region group to generate a probability distribution of magnetic field vectors associated with the geographic region;
determining a magnetic field vector within each geographic region based on the probability distribution, wherein the determined magnetic field vector is a vector that predicts a local magnetic field in the geographic region, wherein determining the magnetic field vector comprises:
determining a confidence score for each of the magnetic field vectors in the geographic region, the confidence score indicating a probability of a corresponding magnetic field vector being measured in the geographic region; and
determining the local magnetic field vector of the geographic region based on the confidence score for each of the magnetic field vectors;
generating a magnetic field vector map that includes the determined magnetic field vector and the corresponding geographic region;
receiving a user data from a client device, the user data describing a user location of the client device and a magnetic field vector at the user location; and
estimating a pose of the client device based on the user data and the generated magnetic field vector map.

9. The non-transitory computer-readable storage medium of claim 8, wherein estimating the pose of the client device based on the user data and the generated magnetic field vector map comprising:
mapping the user location to the magnetic field vector map to identify a geographic region corresponding to the user location;
determining a local magnetic field vector corresponding to the geographic region based on the magnetic field vector map;
comparing the determined local magnetic field vector and the received user magnetic field vector from the client device; and
estimating the pose of the client device based on the comparison.

10. The non-transitory computer-readable storage medium of claim 8, wherein determining the magnetic field vector of the geographic region based on the confidence score for each of the magnetic field vectors comprises:
selecting, from the magnetic field vectors in the geographic region, a magnetic field vector having a confidence score that meets or exceeds a score threshold.

11. The non-transitory computer-readable storage medium of claim 8, wherein the operations further comprise:
aggregating additional magnetic field measurements in the geographic region to update the probability distribution of the magnetic field vectors;
updating the confidence score for each of the magnetic field vectors; and
determining the magnetic field vector of the geographic region with the updated confidence score.

12. The non-transitory computer-readable storage medium of claim 8, wherein the determined magnetic field vector is a vector that predicts a true magnetic field in the geographic region.

13. The non-transitory computer-readable storage medium of claim 8, wherein generating the magnetic field vector map comprise:
simulating the magnetic field vector map based on geographic locations and geographic features; and
updating the magnetic vector map using the probability distribution of the magnetic field vectors.

14. The non-transitory computer-readable storage medium of claim 8, wherein determining the magnetic field vector within each geographic region based on the probability distribution comprises:
inputting the probability distribution of the magnetic field vectors in a machine learning model;
predicting a magnetic field vector that is most likely to represent the local magnetic field in the geographic region; and
determining the predicted magnetic field vector as the determined magnetic field vector in the geographic region.

15. The non-transitory computer-readable storage medium of claim 8, wherein the magnetic field measurements are captured from magnetic sensors of a plurality of mobile devices.

16. A computer system comprising:
at least one processor; and
a non-transitory computer readable medium comprising stored instructions, the instructions when executed by the at least one processor cause the at least one processor to:
receive a plurality of magnetic field measurements from a plurality of client devices, each magnetic field measurement describing a magnetic field vector measured by a client device at a geographic location;
group, based on the geographic location of each magnetic field measurement, the magnetic field measurements into one or more region groups, wherein each region group is associated with a geographic region and wherein each region group comprises magnetic field measurements measured at geographic locations within the geographic region of the region group;
aggregate the magnetic field measurements in each region group to generate a probability distribution of magnetic field vectors associated with the geographic region;
determine a magnetic field vector within each geographic region based on the probability distribution, wherein the determined magnetic field vector is a vector that predicts a local magnetic field in the geographic region;
generate a magnetic field vector map that includes the determined magnetic field vector and a corresponding geographic region;
receive a user data from a client device, the user data describing a user location of the client device and a magnetic field vector at the user location; and
estimate a pose of the client device based on the user data and the generated magnetic field vector map, wherein the instructions for estimating the pose of the client device based on the user data and the generated magnetic field vector map cause the at least one processor to:
  map the user location to the magnetic field vector map to identify a geographic region corresponding to the user location;
  determine a local magnetic field vector corresponding to the geographic region based on the magnetic field vector map;
  compare the determined local magnetic field vector and the received user magnetic field vector from the client device; and
  estimate the pose of the client device based on the comparison.

17. A computer-implemented method, comprising:
receiving a plurality of magnetic field measurements from a plurality of client devices, each magnetic field measurement describing a magnetic field vector measured by a client device at a geographic location;
grouping, based on the geographic location of each magnetic field measurement, the magnetic field measurements into one or more region groups, wherein each region group is associated with a geographic region and wherein each region group comprises magnetic field measurements measured at geographic locations within the geographic region of the region group;
aggregating the magnetic field measurements in each region group to generate a probability distribution of magnetic field vectors associated with the geographic region;
determining a magnetic field vector within each geographic region based on the probability distribution, wherein the determined magnetic field vector is a vector that predicts a local magnetic field in the geographic region;
generating a magnetic field vector map that associates the determined magnetic field vector with a corresponding geographic region;
receiving a user data from a client device, the user data describing a user location of the client device and a magnetic field vector at the user location; and
estimating a pose of the client device based on the user data and the generated magnetic field vector map, wherein estimating the pose of the client device comprises:
  mapping the user location to the magnetic field vector map to identify a geographic region corresponding to the user location;
  determining a local magnetic field vector corresponding to the geographic region based on the magnetic field vector map;
  comparing the determined local magnetic field vector and the received user magnetic field vector from the client device; and
  estimating the pose of the client device based on the comparison.

\* \* \* \* \*